(12) United States Patent
Ryan et al.

(10) Patent No.: US 6,304,859 B1
(45) Date of Patent: Oct. 16, 2001

(54) SYSTEM AND METHOD FOR PREMIUM OPTIMIZATION AND LOAN MONITORING

(75) Inventors: Raymond B. Ryan, Darien; Wendy J. Engel, Norwalk; Samuel Melamed, Stamford, all of CT (US)

(73) Assignee: Evergreen Group, Incorporated, Stamford, CT (US)

( * ) Notice: Subject to any disclaimer, the term of this patent is extended or adjusted under 35 U.S.C. 154(b) by 0 days.

(21) Appl. No.: 09/193,366

(22) Filed: Nov. 17, 1998

Related U.S. Application Data

(62) Division of application No. 08/587,051, filed on Jan. 16, 1996, now Pat. No. 5,839,118.

(51) Int. Cl.$^7$ ............................................. G06F 17/60
(52) U.S. Cl. ............................. 705/38; 705/4; 705/35; 705/39
(58) Field of Search ......................... 705/38, 4, 35, 705/39

(56) References Cited

U.S. PATENT DOCUMENTS

| | | | |
|---|---|---|---|
| 4,750,121 | * | 6/1988 | Halley et al. ................... 705/35 |
| 4,953,085 | * | 8/1990 | Atkins ............................ 705/36 |
| 4,969,094 | * | 11/1990 | Halley et al. ................... 705/36 |
| 5,025,138 | * | 6/1991 | Cuervo .......................... 705/38 |
| 5,429,506 | * | 7/1995 | Brophy et al. ................. 434/107 |
| 5,590,037 | * | 12/1996 | Ryan et al. ...................... 705/4 |
| 5,797,133 | * | 8/1998 | Jones et al. .................... 705/38 |
| 5,802,500 | * | 9/1998 | Ryan et al. ..................... 705/36 |
| 5,875,437 | * | 2/1999 | Atkins ............................ 705/40 |
| 5,907,828 | * | 5/1999 | Meyer et al. .................... 705/4 |
| 5,911,135 | * | 6/1999 | Atkins ............................ 705/36 |
| 5,911,136 | * | 6/1999 | Atkins ............................ 705/36 |
| 5,926,800 | * | 7/1999 | Baronowski et al. ........... 705/35 |
| 5,930,776 | * | 7/1999 | Dykstra et al. ................. 705/38 |

FOREIGN PATENT DOCUMENTS

| | | | |
|---|---|---|---|
| 410049589 | * | 2/1998 | (JP) . |
| 95/23379 | * | 8/1995 | (WO) . |

OTHER PUBLICATIONS

Underwood, "Private or Personal pensons: Leveraged Split Dollar increases retirement capital", J of the Am Soc of CLU and ChFC, v47n4 pp: 70–78 Jul. 1993.*
Kral, "Drawing for Split Dollars", LAN Aug. 1992.*
Koco, Life Ins. Funded using mutal funds as collateral, Life and health/Financial Services, National Underwriter, v. 99, Iss 2, Ja, 1995.*
Christensen, Life Insurance Contracts and the Payment of Premiums, Trusts and Estates, Jun. 1995.*
Wilcox, Joe, "Tapping Technology's Toolbox", Life Association News, Washington, D. C., Jun. 1995.*
Richey, Louis R. and Brody, Lawrence, Comprehensive Deferred Compensation, National Underwriter Company, 1989, Chapters 1–3.*

* cited by examiner

*Primary Examiner*—V. Millin
*Assistant Examiner*—Jagdish Patel
(74) *Attorney, Agent, or Firm*—Peter K. Trzyna, Esq.

(57) ABSTRACT

A system and process linking an external computer with an illustration system of an insurance carrier and a system of an independent lending institution, via modem, to determine the optimal premium structure for a contemplated variable life insurance product using a portion of the policy owner's money and a lending institution loan to finance the premium. The system and process can also provide for simultaneously tracking several variable life insurance policy cash values to ensure each individual policy cash value is adequate for collateral purposes.

12 Claims, 9 Drawing Sheets

EMPLOYEE CENSUS DATA STRUCTURE

| Employee | Age | Sex | Number of Premiums | Face Amounts | Years Until Retirement | Projected Cash Value | Targeted Cash Value | Premium Value |
|----------|-----|-----|--------------------|--------------|------------------------|----------------------|---------------------|---------------|
| 1 | 45 | M | 10 | 250000 | 17 | ... | ... | ... |
| 2 | 38 | F | 17 | 400000 | 24 | ... | ... | ... |
| 3 | 52 | F | 3 | 120000 | 13 | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| X | ... | ... | ... | ... | ... | ... | ... | ... |

LOAN/CASH VALUE DATA STRUCTURE

| Employee | Policy # | Cumulative Premium | Cumulative Loan | Cash Value | Loan to Cash Value Ratio | Maximum Ratio |
|---|---|---|---|---|---|---|
| 1 | 1A54FR875 | $3,289 | $1,425 | $9,584 | 0.1486 | 0.28 |
| 2 | 1A65PP547 | $5,742 | $2,860 | $14,256 | 0.2006 | 0.28 |
| 3 | 1A69WL254 | $6,524 | $3,247 | $17,648 | 0.1839 | 0.28 |
| ⋮ | ⋮ | ⋮ | ⋮ | ⋮ | ⋮ | ⋮ |
| X | | | | | | |

SYSTEM AND METHOD FOR PREMIUM OPTIMIZATION AND LOAN MONITORING

This application is a divisional of Ser. No. 08/587,051 filed Jan. 16 1996, now U.S. Pat. No. 5,839,118.

FIELD OF THE INVENTION

The present invention is directed to a computerized system and method for administering an employer pension plan funded with life insurance, and, more particularly, for determining the optimum premium structure necessary to achieve financial security at retirement, while providing a sufficient level of life insurance protection during employment, and ensuring that each individual policy cash value is adequate for collateral purposes.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

In recent times, sophisticated employer funded pension plans have been designed to provide secure and risk free benefits for employees and that, if managed correctly, provide favorable tax treatment for both employer and employee. Such pension plans have become complex in operation and structure, and often involve more than one legal entity providing services to plan participants and managers. Thus, operation and administration of such plans has become extremely difficult due to the constraints under which such plans must function to operate appropriately, and due to the required interactions between the parties, as well as due to government regulation.

Various computer systems are used by fund managers and others involved in pension plan administrations. However, due to the complexity of recent sophisticated pension plans, existing computer systems are unable to handle the operations that are required for successful plan administration.

To fully understand the deficiencies in existing computer systems that assist in the administration of pension plans and the like, a short explanation of the development and structure of recent complex pension plans is provided.

As today's workforce ages in an era of social security uncertainty, employees rely heavily on employer provided retirement income for financial security during their retirement years. Until recently, the tax qualified pension plan has been the optimal and primary funding vehicle. Under a qualified pension plan, the employer's funding contributions are tax deductible, the plan assets reside in a trust that is secure from the employer's creditors, and the investment returns grow tax free. Retirees are only subject to taxation on their retirement benefits when received.

However, this reliance is jeopardized by the rapidly changing economy that employers (which are typically corporations) currently face. During the past decade, the federal government has passed a series of tax law changes that are designed to minimize the amount of retirement benefits that can be funded via a qualified pension plan. As a result, some portion of an employee's retirement benefits are often paid by an unfunded supplemental retirement plan.

Under this arrangement, the employee is simply an unsecured creditor of the employer for the balance of the retirement benefits not included in a qualified pension plan. When the employee reaches retirement age, there is a possibility that many of today's corporations will no longer exist or be in a financial position to honor unfunded promises. Thus, many employees are exposed to the risk that their retirement income will be severely restricted or not available to them upon retirement.

Similarly, most corporations purchase or sponsor group term life insurance for their employees' death protection. Again, however, favorable tax treatment is only afforded to the first $50,000 per employee of employer provided group term life insurance. In most cases, this level of insurance is inadequate to cover the financial needs of an employee's family upon the employee's death. While an employer may provide additional group term life insurance above this level, for tax purposes an employee receiving additional group term life is considered to be receiving income and is subject to a tax on an imputed income basis.

Again, the tax rules have been structured to discourage this corporate benefit. At ages in excess of 45, the imputed income often exceeds the cost of buying the insurance outside of a corporate sponsored plan. Also, many corporations have cut back on the amount of group term life insurance offered to employees. As a result, most employees, particularly senior level employees, must buy death protection outside their corporate sponsored plans. So doing, they forgo the economies of scale associated with buying life insurance coverage as a group.

As an end result, because only a minimal insurance benefit is available from their employer, many employees fail to obtain adequate life insurance. This decision exposes the employee's family to the possibility of serious financial crisis if the employee dies unexpectedly.

Most major employers have struggled with how to fund for retirement benefits in excess of the qualified pension limits. Only a few corporations to date have attempted to apply their bulk purchasing power to help their employees attain a level of adequate life insurance. Clearly, a major stumbling block is achieving retirement benefit security on a cost effective basis. Also, employers want funding programs that create incentive for employees to remain in service, such as the vesting rules that are built into pension plans.

Funding programs and plans, such as the rabbi trust, the secular trust, bonus and/or annuity plans and split dollar plans, have attempted to deal with the problems discussed above, but have one or more major defects. For example, the rabbi trust program is not secure from corporate creditors. Secular trusts provide bankruptcy protection, but require a payment of tax at funding (as well as a tax on any tax reimbursement, i.e., a tax gross-up), and the asset's investment income is taxed currently. Bonus and/or annuity plans also require tax gross-ups at the funding point and such plans do not tie the employee to the company after funding occurs. Finally, although split dollar plans can provide a nice combination of corporate sponsored death protection and tax free asset accumulation, they require an investment of cash far greater than that required to fund other types of pension plans.

SUMMARY OF PROPOSED PLAN

We have devised and designed a plan, termed an Insured Security Option Plan ("ISOP™"), to give employers a vehicle to fund their employees' deferred compensation and to provide for supplemental employee retirement plan obligations. The ISOP™ plan will overcome the deficiencies in existing plans, as described above, and will provide significant advantages to both the employee and the corporate employer. However, to operate the ISOP™ plan effectively requires a complex and sophisticated computer system, heretofore unavailable. To fully appreciate the advances made in this computer system requires a brief explanation of the ISOP™ plan. However, it is noted that the principles of the present invention are applicable to the administration of sophisticated plans other than the ISOP™ plan described herein.

The ISOP™ plan makes possible a new and cost effective funding method. It permits a multiple purchase of life contracts on behalf of employees, thus reducing the cost of the insurance for each employee. The cash value of the policy is used to accumulate funds tax free so that, at retirement, there are adequate assets owned by the employee to provide for the employee's retirement. In addition, the policy acquisition method avoids the need to gross-up the premium payment and still enables the corporation to obtain a tax deduction for the funding contribution.

It is possible to structure the purchase of a life insurance policy (most commonly a variable life policy) for the employee using a portion of money provided by an employer and the remainder by a loan through a non-qualified benefit plan. The policy allows for money to be set aside for the employee's retirement and provides adequate insurance to protect the employee's family, while the loan supplies incentive for the employee to remain loyal to the employer.

Because the policy is not purchased by the employer, the amount of insurance purchased is not restricted by tax qualified benefit rules. Thus, the employee is free to choose an amount of insurance adequate to cover his or her family's needs should he or she unexpectedly die. In addition, the policy may be used to accumulate savings, tax free, to fund for retirement benefits. Finally, because the remaining portion of the employee's premium is financed using a loan, the conditions of the loan can be such that should the employee choose to leave the employment of the company, the policy will be surrendered for its cash value, the loan paid off, and the net proceeds distributed to the employee. As a result, an employee who departs the company prior to retirement will not only forfeit future funding, but also the earnings on the future amounts to be paid into the policy.

The following is a simple example of the operation of the ISOP™ plan. The employer pays the employee $100 of tax-deductible compensation, comprising $56 of insurance premium and $44 of income tax withholding (assuming a 44% tax rate). The $56 received from the employer is used as part of the premium payment to purchase an individual variable life contract with a premium of $100 from Insurance Carrier A. The employee is not out-of-pocket any incremental tax from the transaction at this step. Still, to give economic results comparable to, for example, a 401(k) plan, the after-tax cash available to invest inside the insurance contract must be $100. As a result, another $44 of premium needs to be generated to be paid to Insurance Carrier A. The additional premium comes from an employee benefit plan governed by ERISA. The ERISA plan borrows $44 from Bank B (which is paid to Insurance Carrier A) and uses the insurance policy as security for the lending bank, Bank B. The entire policy cash value can be used as collateral. Thus, the ERISA plan contributes the $44 as the second part of the insurance premium. Of course, during operation of the plan, Bank B needs to be paid interest on the loan; assume the interest is $4. Also assume that the employer chooses to accept responsibility for making the interest payments (e.g., contingent upon the employee's continued employment). The employer then notionally pays the employee $7, of which $4 is paid to the ERISA plan and becomes the ERISA plan contribution (which is then paid to Bank B as the interest payment) and $3 is income tax withholding. At plan termination, the employee receives the policy surrender value of the insurance contract issued by Insurance Carrier A, less the amount needed to repay the loan to Bank B. It will be understood that variations on this example will still fall within the principles of the ISOP™ plan, e.g., the interest payments could be left to the employee.

It can be seen from the above example that a number of independent parties are involved: the employer, the employee, Insurance Carrier A, Bank B and the ERISA plan, as well as the entity responsible for management of the ISOP™ plan, e.g., the plan manager or administrator. It will be appreciated that the plan administrator will likely manage plans involving a number of employees of the employer, and for one or more employers.

The plan administrator needs a sophisticated computer system to successfully assist in management of the ISOP™ plan. In particular, there are two important operations that the plan administrator performs, namely: (1) determining the optimum life insurance premium structure, necessary to achieve financial security at retirement while providing a sufficient level of life insurance protection during employment, using a portion of the policy owner's money (e.g., the $56 received from employer) and a bank loan (e.g., the $44 loan from Bank B) to finance the premium; and (2) simultaneously tracking several variable life insurance policies' cash values to ensure that each individual policy's cash value is adequate for collateral purposes for its associated loan(s) from the lending institution, e.g., Bank B.

In order to provide the necessary funds for financial security during an employee's retirement, one must determine a premium structure for such a life policy. These premium payments must be enough to allow the policy to grow sufficiently to provide the after-tax cash needed by the retiree once he or she repays the loan incurred as part of the purchase of the policy.

Presently, a before-tax cash value may be determined for a given premium level using an insurance carrier's illustration system. However, this function does not meet the requirements for administering plans such as the ISOP™ plan. The contemplated ISOP™ plan requires determining the optimum premium structure to provide a cash sum, after the payment of taxes and the repayment of the loan used to purchase the policy, necessary to provide for the employee's retirement needs. What is needed to administer such a plan is a means to solve for four dependent variables, each changing with the amount of premium used: 1) the before-tax policy cash value; 2) the cumulative loan; 3) the employee's tax basis in the policy; and 4) the desired face amounts during employment, i.e., death benefits.

Moreover, this means must be able to accomplish this task in a reasonably timely manner in order to be economically feasible for administering large plans.

Moreover, there does not exist a computer system for ensuring that, in real-time and simultaneously for multiple variable life insurance policies, the cash values of the insurance policies are sufficient for collateral against loans from an independent party (e.g., a bank) that were used as partial funding for the insurance contracts premium.

Moreover, because various parties are involved in and have an interest in the operation of the plan, there exists a need for a computer system that facilitates and improves communication in real-time between the various parties.

SUMMARY OF THE INVENTION

The present invention is a computerized system and method to administer a sophisticated, employer funded, pension plan, such as, for example, an ISOP™ type plan. In particular, the computer system and method of the present invention determines the optimum life insurance premium structure necessary to produce a policy cash value which will allow the insured to achieve financial security at retirement while providing a sufficient level of life insurance protection during employment (hereafter "Optimal Premium"), and ensures, in real-time, that each individual policy cash value is adequate for collateral purposes.

The present invention involves a system performing three processes, which ideally occur simultaneously, namely, 1) optimal premium determination, 2) current cash value monitoring, and 3) periodic reporting.

It is noted that the system initially requires the input of several pieces of information which are stored on the system's computer readable memory. This information includes data that is specific to one individual's policy application: sex, age, targeted face amounts, expected retirement age, expected return on separate accounts where applicable, number of premiums, and individual tax rate. The system can then draw on this information as needed to complete the necessary processes.

A. Optimal Premium Determination. The present invention communicates with an insurance carrier's computer system to determine the optimal premium for a life insurance policy purchased with a portion of money provided by an employee and the remainder by a loan secured by the policy's cash value. So that an exact result can be obtained, taking into account a number of variables each changing with the amount of premium, the present invention performs multiple iterations of the following operations until the required result is obtained. The present invention communicates, via an electronic computer-to-computer communication mechanism, such as, for example, a modem, with the computer system of the insurance carrier to solve for a premium structure given a targeted after-tax cash value at a future point in time.

Thus, in the context of administration of an ISOP™ plan, the present invention communicates with an external computer system of an insurance carrier (e.g., via modem) to determine the optimal variable life insurance premium structure necessary to yield a before-tax cash value sufficient to support the targeted after-tax cash value at retirement, less the repayment of the loan, needed for an employee's retirement. Typically, the insurance carrier's computer system comprises an insurance illustration system which can determine a before-tax cash value given a specific premium level. A before-tax cash value, and the cumulative loan and tax basis, all varying with each premium structure, are necessary to determine a targeted after-tax, net of loan, cash value at retirement.

Accordingly, to accommodate the needs of the plan under administration and the existing capabilities of the insurance carrier's insurance illustration system, the present invention performs multiple iterative communications from an external computer system, e.g., via modem, to determine the optimal premium for a targeted after-tax, net of loan, cash value at retirement and face amounts during employment. As used herein, the term "external computer system" means a computer system remote from the computer system under discussion, e.g., a computer is external to an insurance carrier's computer system if it is located remotely in relation to the insurance carrier's computer system and is not controlled by the insurance carrier.

Multiple iterations are performed between the two computer systems to determine the optimal premium. The external computer of the present invention determines, and then communicates, a premium structure to the insurance carrier's computer system (this premium structure is a "best" or initial guess) and receives projected before-tax cash values and calculated face amounts. The external computer then determines whether the projected before-tax cash value for the expected year of retirement is sufficient to meet the desired retirement cash total after the payment of taxes and the repayment of the loan, in addition to determining if the calculated face amounts are equal to or greater than the targeted face amounts during employment. If the cash value and face amounts targeted are met, the optimal premium has been determined. If not, the external computer determines and communicates a different premium structure to the insurance carrier's system, either higher or lower given the outcome of the previous process, and receives new projected before-tax cash values and calculated face amounts. Again, the external computer determines if the desired after-tax, net of loan, cash value at retirement can be met, while meeting the targeted face amounts during employment. These iterations between the external computer and insurance carrier's computer system continue until the desired result is returned. Once a premium structure is found that produces before-tax cash value sufficient to meet the targeted after-tax, net of loan, cash value at retirement and the targeted face amounts during employment, the optimal premium becomes known and is stored in the external computer's memory.

Thus, this process allows for the determination of the optimal premium necessary to provide the targeted after-tax, net of loan, cash value at retirement required by an employee, as well as the targeted face amounts during employment, in a reasonably timely manner, without the need for human intervention.

B. Monitoring Function. Secondly, the present invention, in administering a plan such as the ISOP™ plan, monitors the actual current cash value of each insurance policy to ensure that it is sufficient to serve as collateral on the loan that was used to fund part of the premium for the insurance policy. (As discussed above, the loan may be from a bank to an ERISA plan, and the collateral for the loan may be the cash value of the insurance policy. The loan is an important aspect of the contemplated life insurance policy because the loan provides the ability to purchase the same amount of insurance and meet the targeted cash value at retirement with after-tax dollars as if the policy were purchased using before-tax dollars.) It should be noted that the actual cash value of the insurance policy will vary on a day-to-day basis. If the ISOP™ plan (or any like plan that uses an insurance policy as collateral for a loan to finance all or part of the premium) is to be feasible and acceptable to the lending institution, this monitoring process must be accurate and should occur in real-time or at regular and sufficiently short intervals. Thus, the cumulative policy loan must remain below or equal to a specified ratio to the policy's periodic cash value.

Otherwise, the risk of making such a loan becomes too great to justify its issuance. The computer system of the present invention keeps track of the current policy cash value through actual investment returns provided electronically, e.g., via modem, from the insurance carrier's computer system. The computer system of the present invention has the capability of then transferring this information to the lending institution's computer system electronically, e.g., via modem.

If the current policy cash value produces a ratio that is greater than the required maximum loan to cash value ratio (hereafter "Required Maximum Ratio") (i.e., the value of the insurance policy is not sufficient to be collateral for the loan), the computer system of the present invention will issue an instruction to request additional funds from the policy owner to decrease the loan associated with the policy. If such additional funds are acquired, the computer system of the present invention notifies the lending institution that the required maximum ratio test is met. If additional funds are not received after a specified time period, the computer system of the present invention will instruct the user to request a full or partial surrender of the policy to repay all or part of the loan. This process repeats at each specified periodic interval.

C. Reporting. Simultaneous to the above processes, the external computer of the present invention will continually track the performance of the policy's actual cash value growth and compare it with the expected cash value growth, given the premium structure, adjustment in investment strategies, and periodic changes in premium structure or surrenders of cash value. Periodic reports detailing the cash value growth of the policy will be generated for the policy owner. In addition, reports detailing all transactions involving each variable life policy will be generated on a periodic basis for the entity administering the plan and for the lending institution.

Prior to the present invention, no system existed that could interface with an insurance carrier's system to run the necessary iterations to determine the optimal premium for a given after-tax cash value at retirement and targeted face amounts during employment. Further, no system existed to make the necessary calculations for installation and administration of a retirement funding plan using life insurance. In addition, prior to the present invention, no system was known that would allow tracking of an insurance product's periodic cash value to ensure that a required loan to cash value ratio is maintained, and communicate to a lending institution's computer system the results of such a determination.

DETAILED DESCRIPTION

Figure 1:
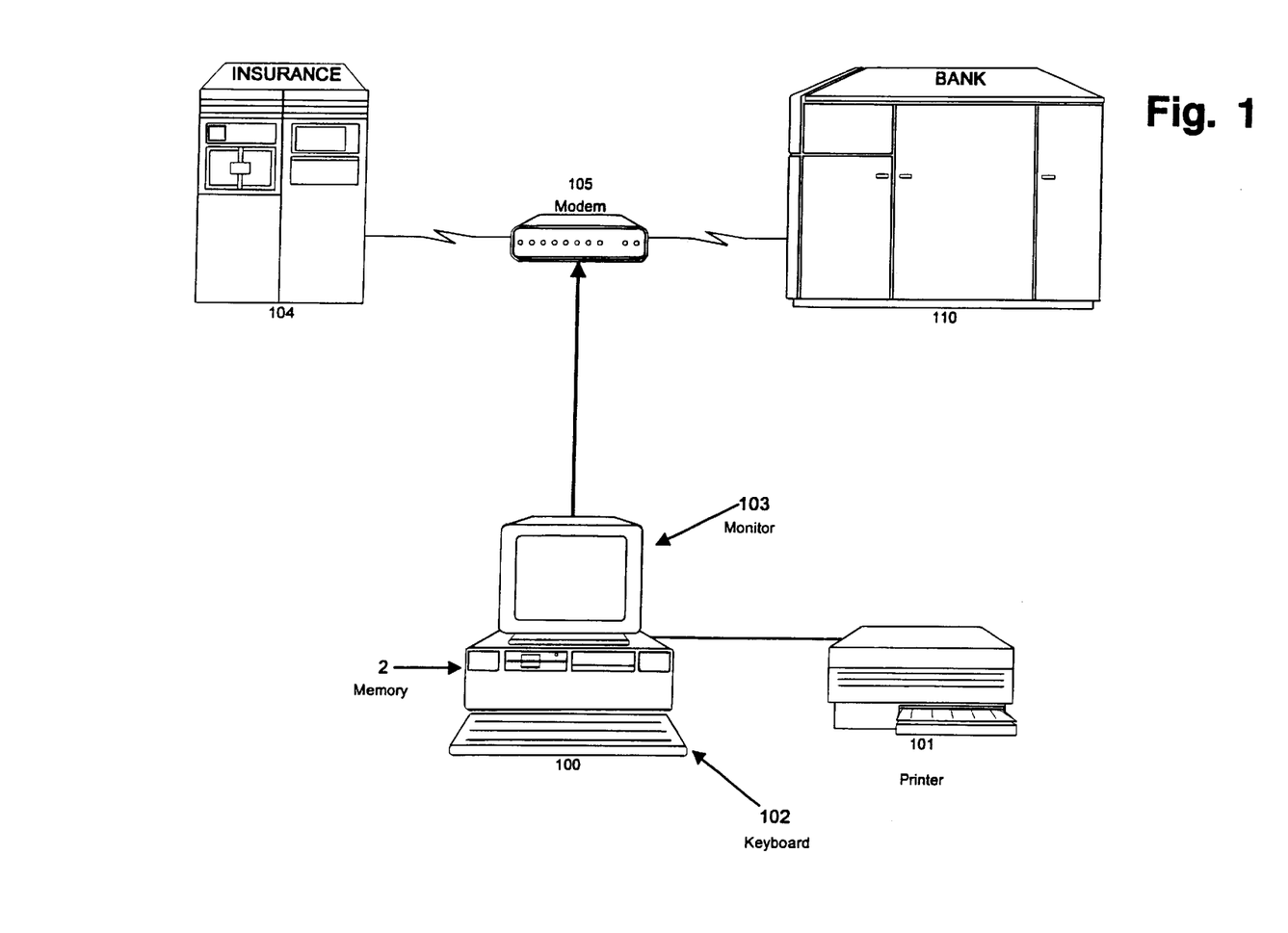
FIG. 1 is a diagram of an exemplary computer system according to the present invention, linked to an insurance carrier's computer system and a bank's computer system.

Referring now to the drawings, and initially FIG. 1, there is illustrated a system architecture diagram according to the present invention. A computer system 100 is coupled by a computer-to-computer communication device, such as, for example, a modem 105, to a computer system 104 of an insurance carrier and a computer system 110 of a lending institution. The lending institution may be, for example, a bank. The insurance carrier's computer system typically will comprise an insurance illustration system.

According to the present invention, the computer system 100 is operated by the administrator of an employer funded pension plan, such as, for example, an ISOP™ plan. As such, the computer system 100 is external to both the computer system 104 of the insurance carrier and the computer system 110 of the lending institution. According to the present invention, the computer system 100 is programmed for administering the employer funded pension plan, and more particularly, for determining the optimum premium structure necessary to achieve financial security at retirement while providing a sufficient level of life insurance protection during employment ("Optimal Premium") , and for ensuring that each individual policy's cash value is adequate for collateral purposes. The computer system 100 is programmed so that it can communicate with the computer system 104 of the insurance carrier and the computer system 110 of the lending institution.

Typically, the computer system 100 will comprise a processor, such as an Intel PENTIUM processor, memory 2 (e.g., a RAM memory and a secondary memory device, such as a CD-ROM drive), input devices (such as a keyboard 102, mouse and/or trackball), and output devices (such as a monitor 103 and a printer 101). Typically, the computer system will also comprise an operating system, such as, for example, the Microsoft Windows operating system.

The computer system 100 of the present invention has capabilities to communicate with and instruct an insurance carrier's illustration system of computer system 104 on an iterative basis to determine, for four dependent variables simultaneously, an optimal premium. In addition, computer system 100 can cause transmission and reception of data and funds to and from the lending institution's computer system 110.

Figure 2:
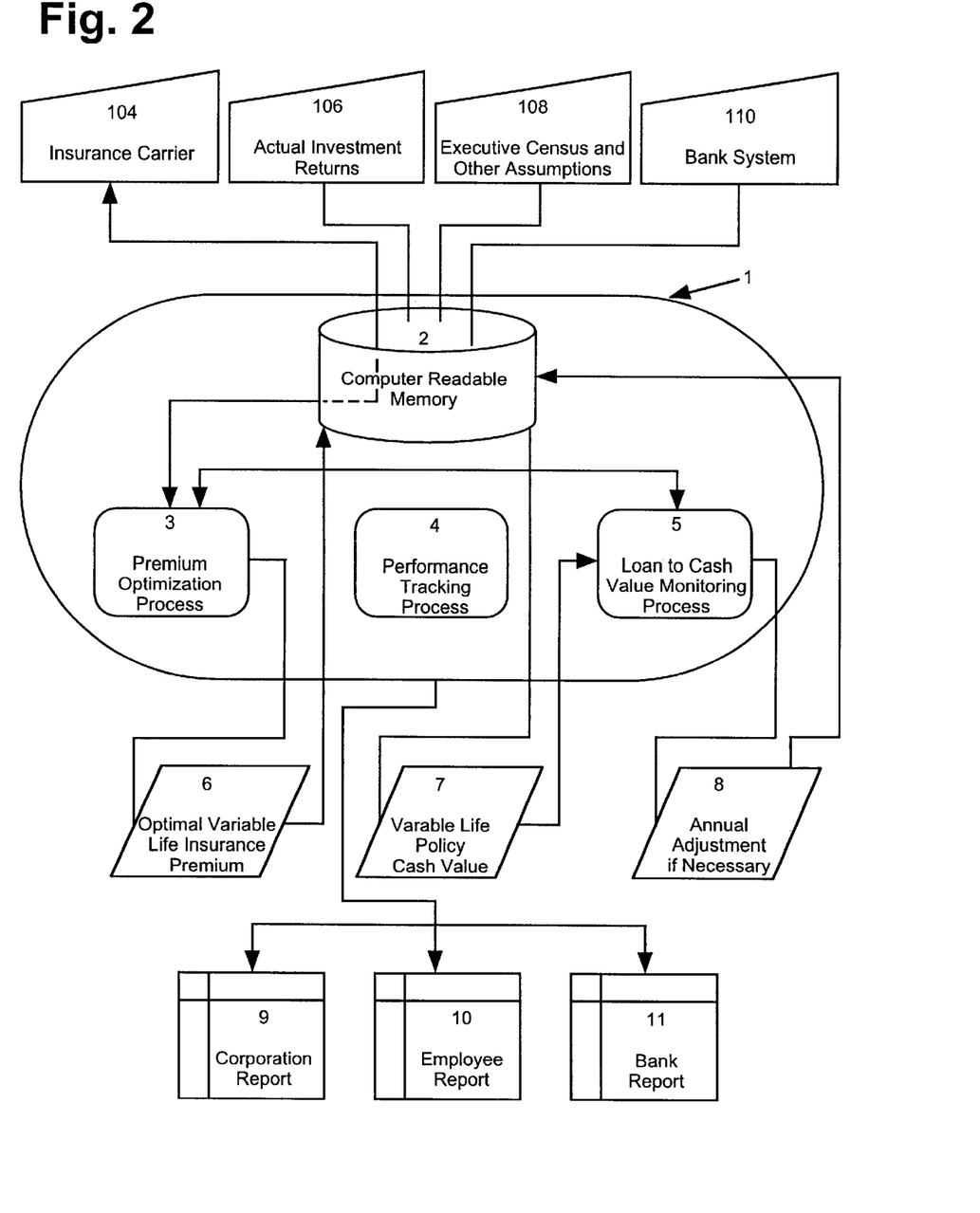
FIG. 2 is a block diagram illustrating an overall view of a representative embodiment of the present invention.

FIG. 2 is a block diagram showing the software components 1 that provide some of the functionality of the present invention. The software components control the operation of and provide the required functionality to computer system 100. In the representative embodiment, the present invention consists of three separate processes 3, 4, 5, that can run simultaneously.

In general, information is received from an insurance carrier's computer system 104 and a lending institution's computer system 110. Information (such as employee census data and assumptions 108, and the actual returns of investment accounts 106) can be entered by a user, at, for example, the keyboard 102. Upon receiving this information, computer system 100 stores the information in memory 2 according to the data structures of the present invention. This allows the computer system 100 to read information from memory 2 for use in the various processes.

The Premium Optimization Process 3 of the present invention determines the optimal premium 6 for the contemplated variable life insurance policy, given a targeted after-tax cash value at retirement and targeted face amounts during employment. In the premium Optimization Process 3, computer system 100 reads specific information, e.g., employee census data 108, such as an executive's age, sex, desired number of premiums, targeted face amounts, and years until expected retirement, from a data structure contained in computer's memory 2. Additionally, the Premium Optimization Process 3 starts with an initial premium structure which may be an estimate, a "best" guess or simply a randomly generated premium structure. (It is noted that this initial premium structure can be determined in advance and stored in memory 2, or can be generated "on-the-fly" and stored in memory 2 after generation.) The Premium Optimization Process 3 then automatically provides this information, in the required format, to the insurance carrier's computer system 104, e.g., via modem 105, and requests that the illustration system of computer system 104 determine projected before-tax cash value amounts. The insurance carrier's computer system 104 calculates its projections and then transmits the projected before-tax cash value amounts back to computer system 100. Upon receiving this data, computer system 100 determines the cash value amount corresponding to the year of retirement and then stores this information in memory 2 in a selected data structure.

Simultaneously, computer system 100 determines the required loan amount and the expected tax liability, both of which are dependent on the given initial premium structure. In addition, computer system 100 determines the minimum face amounts required to satisfy the 7-pay test for a given premium structure. Computer system 100 then determines the amount of before-tax cash value necessary to produce the targeted after-tax cash value at retirement and the targeted face amounts during employment and stores this information in memory 2. Computer system 100 then reads the projected before-tax cash value corresponding to the year of retirement and compares it to the desired before-tax cash value determined by computer system 100. If the difference between these two values is outside the acceptable range, computer system 100 generates a new premium structure, stores this new premium structure in memory 2, and transmits it to the insurance carrier's computer system 104, as described in the previous paragraph, to obtain new projected before-tax cash values. This process continues until a premium structure is found that produces a projected before-tax cash value corresponding to the year of retirement that is within an acceptable range of the desired before-tax cash value at retirement.

Computer system 100 then simultaneously reads the calculated face amounts for this premium structure and compares them with the targeted face amounts. Again, if the calculated face amounts are not within the acceptable range of the targeted face amounts, a new premium structure is generated and the process repeats. If the calculated face amounts are within the acceptable range, computer system 100 determines whether the combination of premium structure and face amounts satisfies the 7-pay test. If so, the optimal premium 6 has been determined. If not, a new premium structure is generated and the process is repeated. Once a premium structure is found that provides the desired before-tax cash value, while producing the targeted face amounts and satisfying the 7-pay test, the optimal premium 6 is known. This optimal premium 6 is stored in memory 2.

Using the optimal premium 6, the corresponding loan amount and the associated tax liability are calculated and stored in memory 2. Computer system 100 can then begin the Premium Optimization Process 3 for the next participant.

After completing this process for each participant in a specified group, computer system 100 transmits all pertinent data to the insurance carrier's system 104 to allow the carrier to prepare for the policy issue and to generate a report 9 for the sponsoring employer stating the pertinent details for each participant.

Once a specific group of participants' policies are purchased, computer system 100 begins simultaneously tracking the cash value growth of each individual policy through the Performance Tracking Process 4. This process entails receiving information on the actual returns of a policy 106 and storing the information in memory 2. Computer system 100 reads this information from memory 2 periodically and generates report 10 for each individual participant. In addition, computer system 100 keeps track of each policy's performance and compares it against the projected performance for that particular policy. This information is stored in memory 2 for use in projecting the performance of policies purchased in the future.

Figure 9:
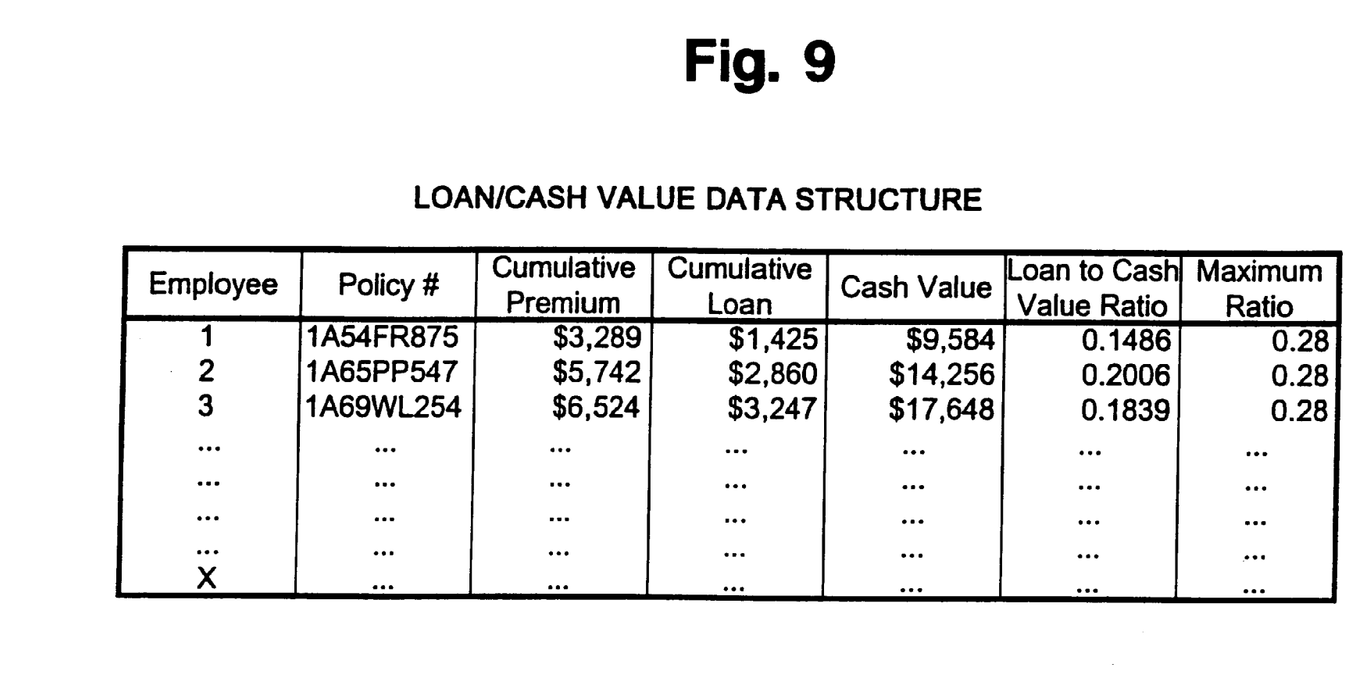
FIG. 9 represents an example of a loan to cash value data structure.

Simultaneously, computer system 100 performs the Loan to Cash Value Monitoring Process 5. In this process, computer system 100 receives information from the lending institution's computer system 110, via modem 105. The lending institution provides a loan to finance a portion of the variable life insurance premium. This information is stored in memory 2 and is used by computer system 100 to monitor the loan to cash value ratio for each individual policy. Computer system 100 reads the loan information and cash value information 7 for a particular participant's policy and determines the actual loan to cash value ratio. Computer system 100 then reads the required maximum loan to cash value ratio ("Required Maximum Ratio"), for this particular policy, from a data structure on its computer memory 2 and compares it with the actual ratio. If the actual loan to cash value for this particular policy is greater than the required maximum ratio, computer system 100 causes a request for an adjustment to be made. This adjustment may require additional cash contributions or a partial or full surrender of the policy. The adjustment information is stored in computer memory 2, and is also transmitted to the lending institution's computer system 110. The Loan to Cash Value Monitoring Process 5 is repeated until the actual loan to cash value ratio for each policy is less than or equal to the required maximum ratio. Computer system 100 then prepares and generates a report 11 with all pertinent information.

Premium Optimization Process 3

Figure 3:
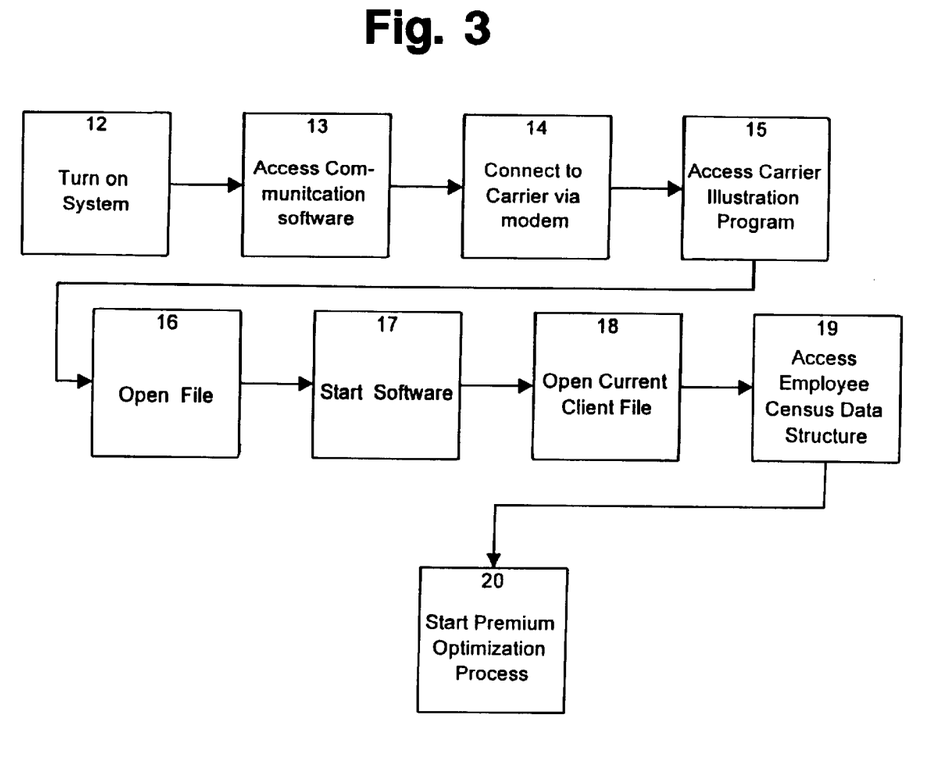
FIG. 3 is a flow chart depicting the premium optimization start-up process of the present invention.

The start up procedure for the Premium Optimization Process is illustrated in flow chart form in FIG. 3. Computer system 100 is turned on 12, e.g., by placing the power switch to the "on" position. In the representative embodiment, communication software, such as that used to operate a modem 105 is accessed 13. This communication software can be created by the user or can be a commercially available package such as PC Anywhere, version 2.0 for Windows, available from Norton. The computer system 100 then establishes communications with the insurance carrier's computer system 104, via modem 105, 14. Once linked, the carrier's insurance illustration system is accessed 15. The software program of the present invention is initialized 16 and executed 17. An employee file is opened 18 and read 19. The employee file contains information pertaining to a preselected group of participants, such as, for example, employee census data 108, e.g., an employee's age, sex, desired number of premiums, targeted face amounts, and years until expected retirement. (In addition, this file can contain the employee's targeted after-tax cash value at retirement. This amount can be either the amount the employee wishes to receive in the form of a lump sum payment in his or her first year of retirement, or can be the net present value of an annuity which makes installment payments to the employee over a specified number of retirement years.) This information will be used in the determination of the optimal premium for each employee's targeted after-tax cash value at retirement and targeted face amounts during employment. The Premium Optimization Process 3 is then started 20. (See FIG. 5, described below.)

Figure 4:
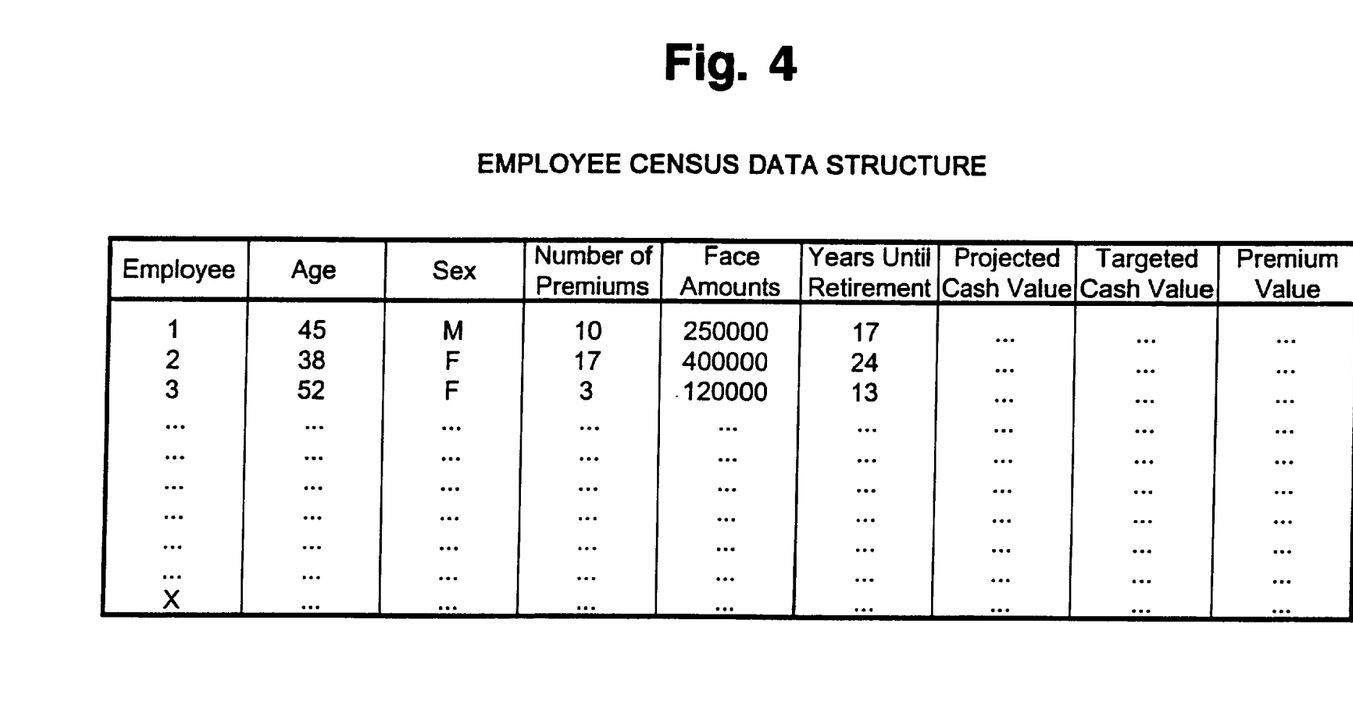
FIG. 4 is an example of an employee census data structure.

FIG. 4 illustrates a simplified example of the data structure, located in memory 2 of computer system 100 and used in the Premium Optimization Process 3. This data structure stores the information used by the computer system 100 to determine the premium structure necessary to produce a targeted after-tax cash value at retirement and targeted face amounts during employment. Such a database will contain, but is not limited to, employee census information 108, such as, for example, information on a participant's age and sex, the number of premiums the participant is willing to pay, the targeted face amounts of the policy, years until the participant expects to retire, the projected before-tax cash value corresponding to the year of retirement, the targeted after-tax cash value at retirement, and an initial premium structure.

Figure 5:
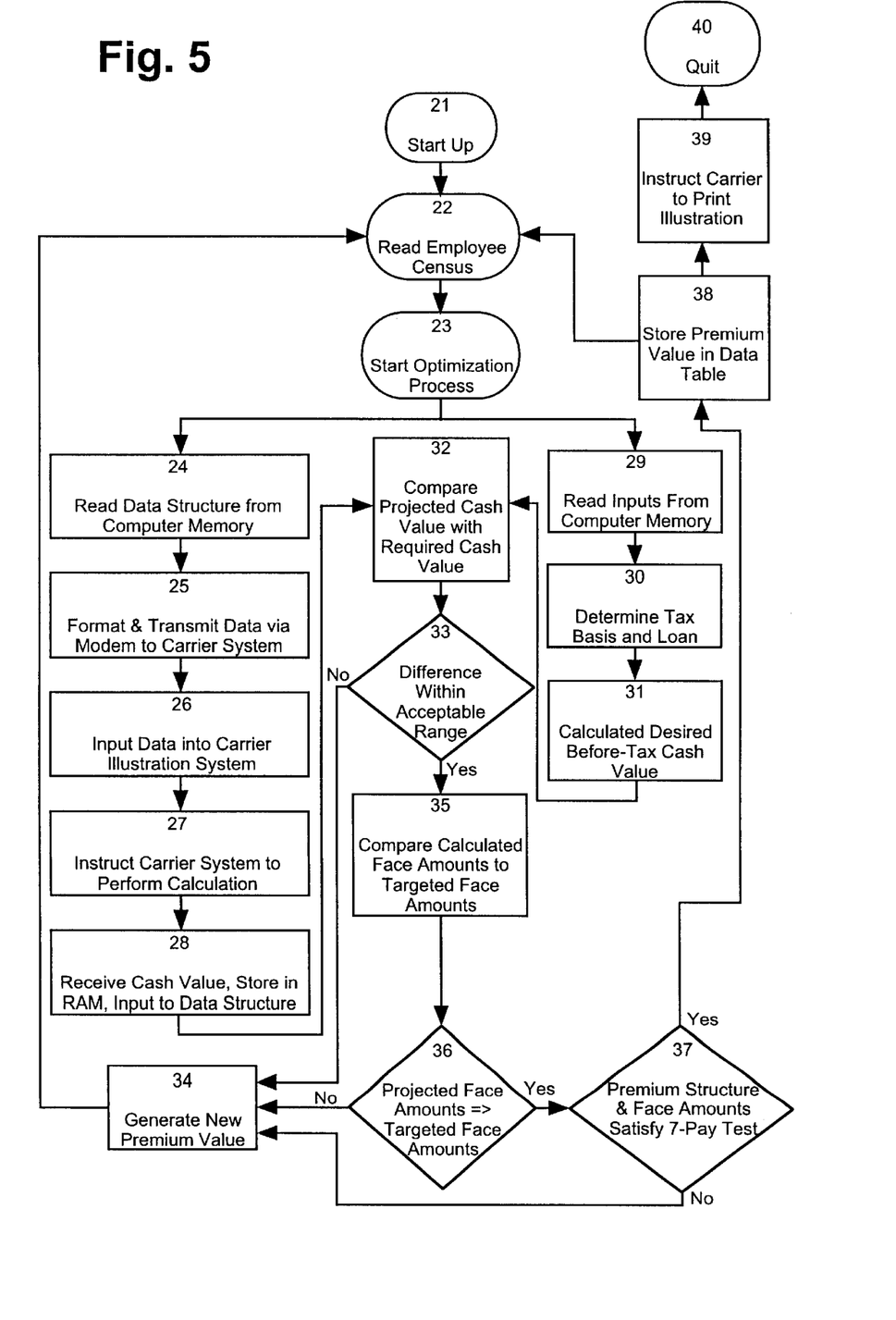
FIG. 5 is data flow diagram illustrating the premium optimization process of the present invention.

FIG. 5 illustrates in flow chart form the steps of the Premium Optimization Process 3 of the representative embodiment of the present invention. This process actually involves two separate operations being performed simultaneously. One operation involves the determination of the projected before-tax cash values and calculated face amounts for a give premium structure. The required employee census information 108 is retrieved, and an initial premium structure is read 24. (See FIG. 4) From this information, the information required by the insurance carrier's computer 104 illustration system is determined, formatted appropriately, transmitted to the insurance carrier's computer system 104, via, modem 105, 25, and then inputted into the appropriate cells within the insurance carrier's product illustration system 26. Included in this information is the initial premium structure. Next, the present invention allows computer system 100 to instruct the insurance carrier's system 104 to perform the necessary calculations to determine the projected before-tax cash values for the inputted values 27. Computer system 100 then instructs the carrier system to transmit the projected before-tax cash values back to computer system 100 where they are received and stored at computer system 100, 28.

The second operation performed during the Premium Optimization Process 3 involves the determination of the amount of before-tax cash value that will be necessary to produce the targeted after-tax cash value at retirement ("Desired Before-Tax Cash Value"). The necessary information is read from memory 2, including the premium structure, desired number of premiums, and years until the participant expects to retire 29. From this information, computer system 100 determines the cumulative tax basis and the amount of loan that will be needed to support this particular premium structure 30. Computer system 100 can then calculate the desired before-tax cash value needed to produce the targeted after-tax cash value at retirement 31.

Computer system 100 reads and compares the projected before-tax cash value corresponding to the year of retirement, received from the insurance carrier's system 100 at step 28, and the desired before-tax cash value it determined at step 31 for this particular premium structure 32. Computer system 100 then determines if the difference between the two is within an acceptable range 33, for example, within $1,000 of each other. However, the present invention is capable of instructing computer system 100 to use any acceptable range when comparing the numbers and determining whether to accept or reject the particular premium structure as the optimal premium. Simultaneous to this comparison, computer system 100 also compares the calculated face amounts with the corresponding targeted face amounts 35, as well as determining if the combination of premium structure and face amounts satisfy the 7-pay test 37. If the calculated face amounts are within the acceptable range of the targeted face amounts and the combination satisfies the 7-pay test, the present invention instructs computer system 100 to store the premium structure in the data structure 38, located on the computer's memory 2, and then instructs the insurance carrier's illustration program to print a report 39 with the projected cash value growth over the life of the policy for this premium structure.

If at any stage computer system 100 determines a discrepancy, either the difference between the projected before-tax cash value and the desired before-tax cash value is not within the acceptable range, the calculated face amounts are not equal to or greater than the targeted face amounts or the combination of premium structure and face amounts do not satisfy the 7-pay test, the present invention instructs computer system 100 to generate a new premium structure 34.

Figure 6:
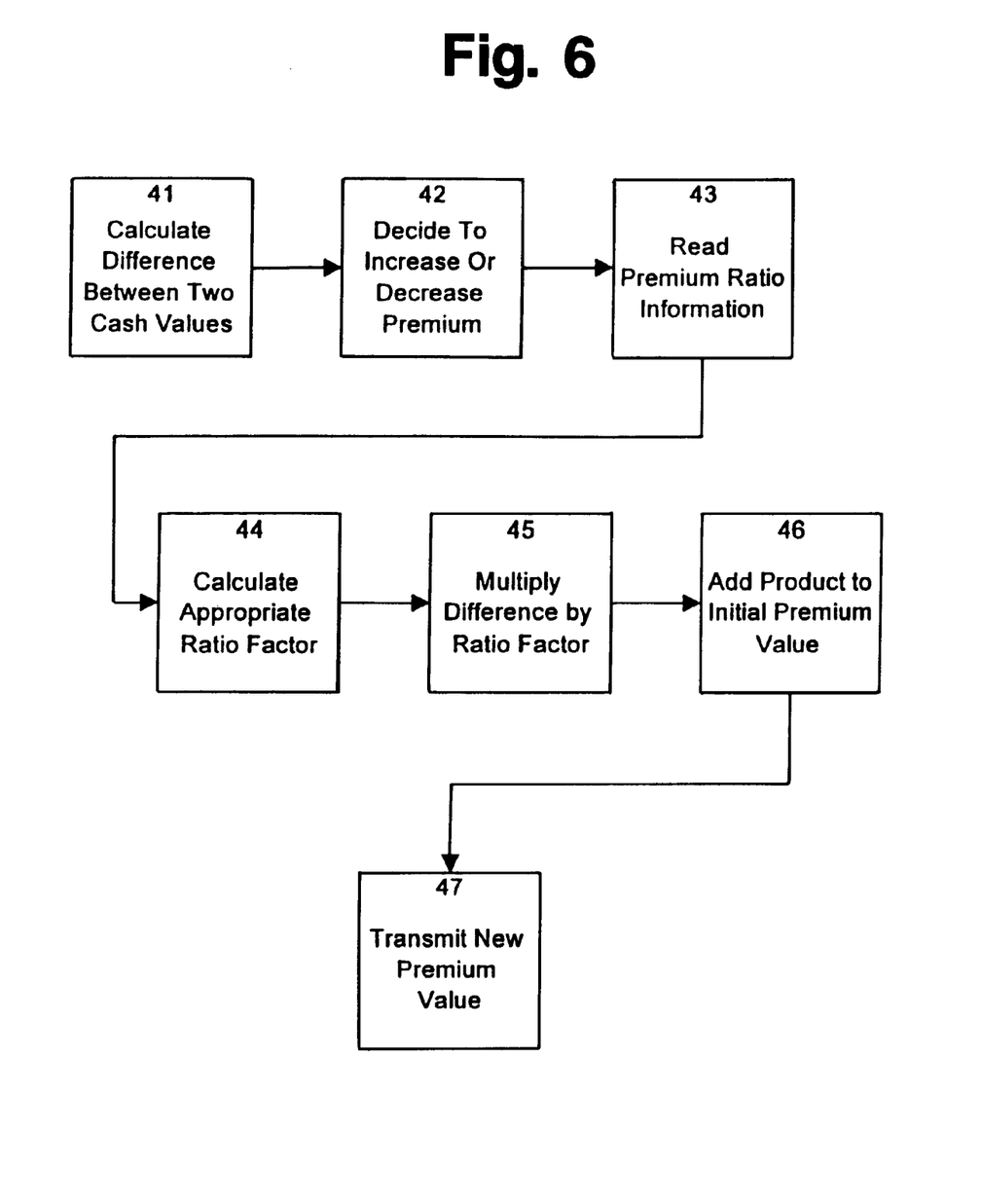
FIG. 6 is flow chart depicting the premium generating process within the premium optimization process of FIG. 5.

FIG. 6 diagrams the method used by the present invention to generate a new premium structure. Computer system 100 calculates the difference between the projected before-tax cash value and the desired before-tax cash value 41. From this calculation, computer system 100 determines whether to increase or decrease the premium structure depending on whether the projected before-tax cash value was less than or greater than the required before-tax cash value 42. If the projected before-tax cash value is greater than the desired before-tax cash value, computer system 100 treats the difference as a negative number. Conversely, if the projected before-tax cash value is less than the desired before-tax cash value, computer system 100 treats the difference as a positive number. Computer system 100 reads data pertaining to the ratio factor 43 and then calculates the ratio factor for the participant, given certain characteristics, such as the age and sex of the participant 44. It is noted that the present invention is not limited to using only age and sex characteristics to calculate the ratio factor. After calculating the ratio factor, Computer system 100 then multiplies the difference between the projected before-tax cash value and the desired before-tax cash value by the ratio factor 45. The present invention then instructs computer system 100 to add the product of that calculation to the initial or prior premium structure used 46. If the projected before-tax cash value was greater than the desired before-tax cash value, this product will be negative because computer system 100 treats the difference as negative. This will cause the prior premium structure to be decreased. Conversely, if the difference is treated as positive, the product will be positive, thus increasing the initial or prior premium structure used.

Returning to FIG. 5, once computer system 100 generates a new premium structure 34, it stores the value in the data structure 22 located in memory 2, and the process (starting at step 23 of FIG. 5) is repeated using the new premium structure. This continues until the difference between the projected before-tax cash value received from the insurance carrier's system 104 is within the acceptable range of the desired before-tax cash value, the calculated face amounts are equal to or greater than the targeted face amounts, and the combination of premium structure and face amounts satisfies the 7-pay test.

The Premium Optimization Process 3 is performed for each participant of a specified group. Once the optimal premium is determined for each individual participant, computer system 100 quits the process 40.

Loan to Cash Value Monitoring Process 5

Figure 7:
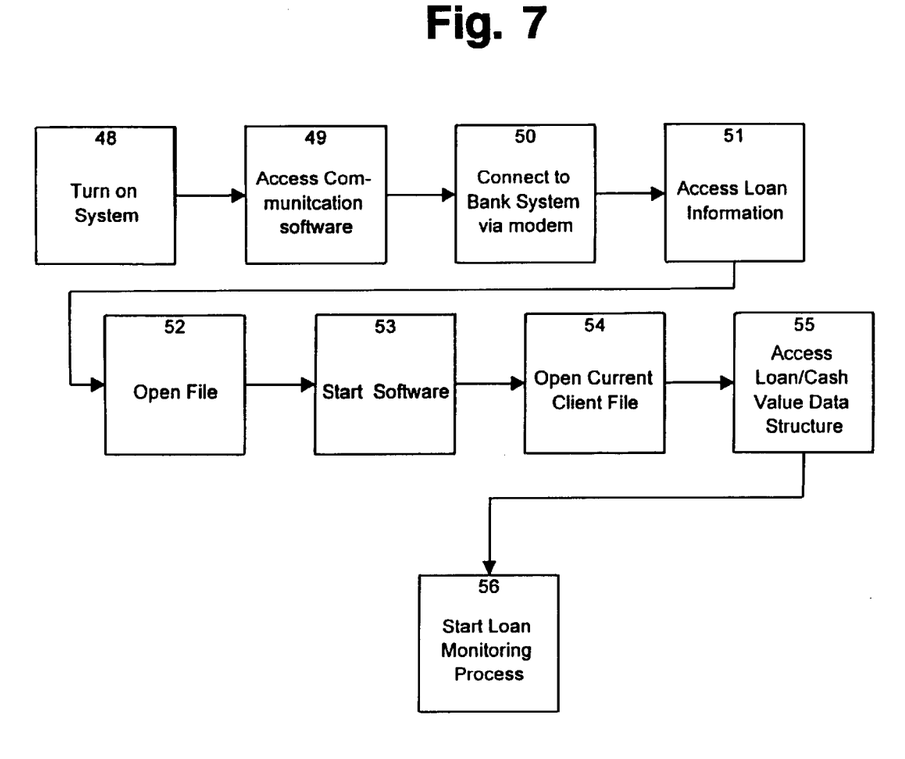
FIG. 7 is a flow chart depicting the loan monitoring start up process of.the present invention.

FIG. 7 illustrates the start up procedure for the Loan To Cash Value Monitoring Process 5. The computer system is started 48 and accesses a communication software package 49. Again, while any type of communication software may be used with the present invention, the representative embodiment uses PC Anywhere, version 2.0 for Windows, available from Norton. Computer system 100 connects with a lending institution's computer system 110, e.g., via modem 105, 50. Information about the loans subject to analysis is accessed from the lending institutions's computer system 110, 51. The software program of the present invention is initialized 52 and executed 53. A client file is opened 54 and read 55. The client file comprises information pertaining to the specified loan(s). The Loan to Cash Value Monitoring Process 5 is then started 56. (See FIG. 8)

Figure 8:
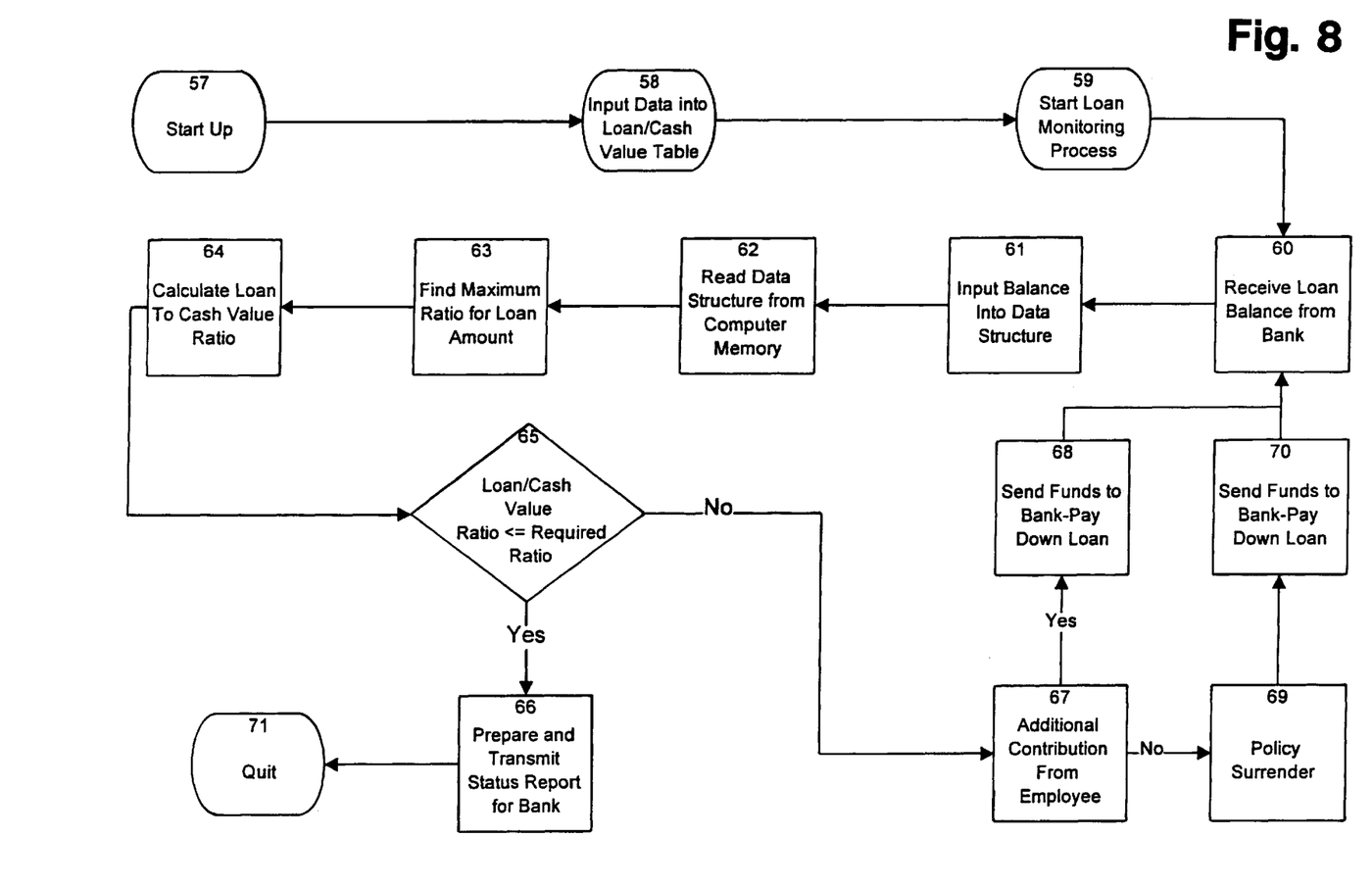
FIG. 8 is a data flow diagram illustrating the loan monitoring process of the present invention.

Turning to FIG. 8, once computer system 100 is started 57, computer system 100 receives pertinent information for monitoring the Loan to Cash Value ratio of a particular policy 58. This information pertains to a specified participant's policy and is stored in the working memory. An example of a data structure comprising such information is shown in FIG. 9. This simplified example shows how information, pertaining to the loan aspect of the variable life insurance policy, is stored on the computer's memory. This information includes, but is not limited to, the participant's name or ID, the participant's policy number, the cumulative premiums paid into the policy, the actual cash value, the cumulative loan, and the required maximum ratio.

Returning to FIG. 8, computer system 100 then begins the Loan to Cash Value Monitoring Process 59. Computer system 100 receives loan information, associated with a specified participant's policy, from a lending institution's computer system 110, via modem 105, 60. Computer system 100 stores this information in memory 2, 61, e.g., in accordance with the data structure shown in FIG. 9. Computer system 100 reads this information 62, from memory 2, and also reads the required maximum ratio 63. Computer system 100 calculates the actual loan to cash value ratio 64, based on the actual cash value of the policy and the amount of loan stored in the data structure located in memory 2. Computer system 100 then compares the actual loan to cash value ratio to the required maximum ratio 65 stored in memory 2. If the actual ratio is less than or equal to the required maximum ratio, computer system 100 generates a report 11, 66, indicating this status for the lending institution. This report is then transmitted, e.g., via modem 105, to the lending institution's computer system 110.

If the actual loan to cash value ratio is greater than the required maximum ratio, computer system 100 instructs the operator to request an additional contribution from the participant to correct the deficiency 67. If such a contribution is received within a specified time period, computer system 100 causes the funds to be sent to the lending institution and which funds are used to pay down the loan 68, thus, bringing the loan to cash value ratio in compliance with the required maximum ratio. This process could also be performed through electronic transfer of the funds. If no contribution is received from the participant within the specified time period, the computer system 100 instructs the operator to request a partial or full surrender of the policy's cash value 69. The money received from this surrender is then sent, possibly electronically, to the lending institution to pay down the loan amount 70, bringing the actual loan to cash value ratio into compliance with the required maximum ratio. This process is simultaneously performed for every policy within a specified group and as each policy falls into compliance with the required maximum ratio for the specified period, computer system 100 stores the relevant information in a data structure located on its memory 2. When all policies are in compliance, the process ends 71.

It is noted that the Loan To Cash Value Monitoring Process 5 can be performed as often as required by the lending institution and/or the fund administrator. For example, the Loan To Cash Value Monitoring Process 5 may take place hourly, daily, weekly or monthly, depending on the circumstances involved.

What is claimed is:

1. A method for monitoring an insurance policy where part of a premium to purchase the insurance policy was funded by a loan from a lending institution and where the insurance policy is collateral for the loan, the method comprising the steps of:

electronically receiving a required maximum loan to cash value ratio from the lending institution;

electronically receiving a loan balance relating to the loan from the lending institution;

determining a current actual cash value of the insurance policy;

calculating a loan balance to cash value ratio based upon said loan balance and said cash value;

comparing the loan balance to cash value ratio with the required maximum loan to cash value ratio;

if the loan balance to cash value ratio is less than or equal to the required maximum loan to cash value ratio, then electronically transmitting a satisfactory status report to the lending institution; and if the loan balance to cash value ratio is greater than the required maximum loan to cash value ratio, then electronically transmitting an unsatisfactory report to the lending institution.

2. The method of claim 1, further including the steps of:

determining an additional contribution that will decrease the loan balance to cash value;

signaling a request for an additional contribution;

causing transmission of the additional contribution to the lending institution if the additional contribution is received within a predetermined time; and signaling a request for partial surrender of the insurance policy if the additional contribution is not received within the predetermined time.

3. The method of claim 2, further including the step of causing the transfer of partial surrender funds to the lending institution if the partial surrender funds are received.

4. The method of claim 1, further including the steps of:

determining an additional contribution that will decrease the loan balance to cash value;

determining an additional contribution that will decrease the loan to cash value;

signaling a request for an additional contribution;

causing transmission of the additional contribution to the lending institution if the additional contribution is receiving within a predetermined time; and signaling a request for partial surrender of the insurance policy if the additional contribution is not received within the predetermined time.

5. The method of claim 4, further including the step of causing the transfer of partial surrender funds to the lending institution if the partial surrender funds are received.

6. A computer-implemented system for monitoring an insurance policy where a part of a premium to purchase the insurance policy is funded by a loan from a lending institution and where the insurance policy is collateral for the loan, the system comprising:

a computer-to-computer communication device to communicate information to and receive information from a computer system of the lending institution;

a processor coupled to the computer-to-computer communication device, the processor including:
  means for receiving a required maximum loan to cash value ratio via the computer-to-computer communication device;
  means for receiving a loan balance relating to the loan via the computer-to-computer communication device;
  means for determining a current actual cash value of the insurance policy;
  means for calculating a loan balance to cash value ratio based upon said loan balance and said cash value;
  means for comparing the loan balance to cash value ratio with the required maximum loan to cash value ratio;
  means for transmitting a satisfactory status report to the lending institution via the computer-to-computer communication device if the loan balance to cash value ratio is less than or equal to the required maximum loan to cash value ratio electronically; and
  means for transmitting an unsatisfactory status report to the lending institution via the computer-to-computer communication device if the loan balance to cash value is greater than the required maximum loan to cash value ratio.

7. The system of claim 6 comprising;
means for determining an additional contribution that will decrease the loan balance to cash value ratio; means for requesting the additional contribution from the insured;
means for causing the transmission of the additional contribution to the lending institution if the additional contribution is receiving within a predetermined time; and
means for requesting a partial surrender of the insurance policy and for causing the transmission of any partial surrender funds received to the lending institution if the additional contribution is not received within the predetermined time.

8. The system of claim 6 wherein the computer-to-computer communication device is a modem.

9. A method implemented on a machine comprising an electrical digital computer having a processor programmed to monitor an insurance policy where part of a premium to purchase the insurance policy was funded by a loan from a lending institution and where the insurance policy is collateral for the loan, the method comprising the steps of:
  electronically receiving a required maximum loan to cash value ratio from the lending institution;
  electronically receiving a loan balance relating to the loan from the lending institution; determining a current actual cash value of the insurance policy;
  calculating a loan balance to cash ratio based upon said loan balance and said cash value;
  comparing the loan balance to cash value ratio with the required maximum loan to cast, value ratio;
  if the loan balance to cash value ratio is less than or equal to the required maximum loan to cash value ratio, electronically transmitting a satisfactory status report to the lending institution;
  if the loan balance to cash value ratio is greater than the required maximum loan to cash value ration, then electronically transmitting an unsatisfactory report to the lending institution.

10. A computer-implemented method for monitoring an insurance policy where part of a premium to purchase the insurance policy was funded by a loan and where the insurance policy is collateral for the loan, the method comprising the steps of:
  electronically receiving a required maximum loan to cash value ratio;
  electronically receiving a loan balance relating to the loan;
  electronically receiving a current actual cash value of the insurance policy, the insurance policy being a variable life insurance policy that has a cash value that will vary day to day;
  calculating a loan balance to cash value ratio based upon said loan balance and said cash value;
  comparing the loan balance to cash value ratio with the required maximum loan to cash value ration to ensure that the required loan balance to cash value ratio is adequate; and
  if the loan balance to cash value ratio is greater than the required maximum loan to cash value ratio, then generating a deficiency instruction.

11. A computer-implemented method for electronically monitoring an insurance policy where part of a premium to purchase the insurance policy was funded by a loan using the insurance policy as collateral, the method comprising the steps of:
  electronically receiving a loan balance relating to the loan;
  electronically receiving a current actual cash value for the insurance policy;
  comparing the loan balance and the actual cash value to test for sufficiency of the actual cash value as the collateral for the loan pursuant to a tax non-qualified benefit plan; and
  if the collateral is insufficient, then electronically generating a deficiency instruction.

12. A computer-implemented method for electronically monitoring an insurance policy where part of a premium to purchase the insurance policy was funded by a loan from an independent lender using an insurance policy as collateral, the method comprising the steps of:
  electronically receiving a loan balance relating to the loan;
  electronically receiving a current actual cash value for the insurance policy,
  comparing the loan balance and the actual cash value to ensure that the actual cash value is sufficient collateral for the loan pursuant to an ERISA plan; and
  if the collateral is not sufficient, then electronically generating a deficiency instruction.

* * * * *